Patented Apr. 18, 1944

2,346,957

UNITED STATES PATENT OFFICE 2,346,957

PRINTING COMPOSITION

Alexander J. Wuertz, Wilmington, Del., and Joseph Deinet, Glassboro, N. J., assignors to E. I. du Pont de Nemours & Company, Wilmington, Del., a corporation of Delaware No Drawing. Application December 17, 1940, Serial No. 370,478

10 Claims. (Cl. 101—170)

This invention relates to the coloring of textiles with lacquer emulsions.

Formerly a preferred method of producing colored patterns on textiles was to apply a dye thereto in a selected pattern from a printing roller. That process had the disadvantage of requiring several process steps and it was limited to compounds which had satisfactory characteristics as a dye. Anthraquinone and other vat colors, because of their fastness, were preferred for printing. These colors were applied from printing rollers which, to hold a vat color printing formula, had to be deeply engraved. The results were excellent of their kind but it was not possible to obtain clarity of design when the design involved fine or intricate markings.

It is an object of this invention to obtain on cloth clear, sharp, designs of very fast colors. A process which has recently been resorted to involves the application to cloth from a printing roller of lacquer emulsion containing pigments. These lacquer emulsions can be applied from a roller using a shallow engraving to give excellent clearness of design even when the roll is engraved with fine and intricate markings. It is another object of this invention to prepare lacquer emulsions from colors having satisfactory characteristics when mixed with the typical components of a lacquer emulsion. In the prior art there was a class of colors called polyanthrimides which were not vat colors because of unsatisfactory fastness, poor strength and a tendency to crocking.

It is our discovery that the anthraquinone pigments called polyanthrimides, when included in lacquer emulsions, are fast, have better tinctorial strength and exhibit less crocking in lacquer emulsions than they do when used as vat colors and that lacquer emulsions containing them can be applied from printing rollers having shallow engraving and intricate design to produce clear, fine designs.

In the practice of our invention, we prefer the di- and tri-anthraquinonyl-amino-anthraquinones, compounds having exterior nuclei of the anthraquinone series and which may have an interior nucleus of the anthraquinone or naphthalene series. By "anthraquinone series" we mean compounds such as anthraquinone and benzanthrone which may, or may not, have substituent radicals of the simple aliphatic type or elements. The nuclei of the polyanthramides are joined by simple NH groups. These compounds are represented by the formula: Aq—NH—(X) Aq in which Aq is of the anthraquinone series (including the benzanthrone series) and X is nothing or is Aq—NH— or Naph—NH—. In the claims which follow the term "polyanthramide" has the foregoing specific meaning.

In the accomplishment of the invention the particular features of the process, as set forth in the following examples, play an important part.

In general the invention may be said to consist in thoroughly incorporating an aqueous paste or suspension of the color with suitable film-forming materials, a volatile water-insoluble organic solvent or solvents and an emulsifying agent and, if necessary, a thickener. These ingredients are so selected and so worked upon that the pigment is dispersed evenly and permanently throughout the mass. When applied to textile goods, the volatile material evaporates leaving the lacquer firmly attached to the textile fiber in the selected pattern.

The film-forming materials, which are used in the emulsion, may be natural or artificial resins and drying oils, preferably those which are resistant to that degree of heat which is undergone in laundering and ironing. Examples of such compounds are linseed oil, the cellulose ethers such as ethyl cellulose, the cellulose esters such as cellulose nitrate and acetate, resins such as phenol formaldehyde, coumarin, urea formaldehyde, and polybasic acid polyhydric alcohol types. Other satisfactory members of the class of water-insoluble film-forming materials are found listed in the examples.

In the composition it is sometimes desirable to include plasticizers in order to give the film-forming material flexibility and softness, and driers to speed up the drying rate thereof. The plasticizers selected are those known in the prior art to be efficient in combination with the particular film-forming material involved.

In a preferred method of making the lacquer the pigment is suspended in water and the suspension is mixed with a composition containing in a water-immiscible solvent a suitable film-forming material. By proper choice of binders, emulsifying agents and mechanical operation one may produce at will an emulsion in which the aqueous phase is dispersed in the organic phase or an emulsion in which the organic phase is dispersed in the aqueous phase. The water-immiscible organic liquid is exemplified by benzene, toluene, xylene, solvent naphtha, alkyl acetates, aliphatic alcohols and mineral oils, such as gasoline, mineral spirits and kerosene.

The principal object of the invention and other objects thereof will be found in the following examples which are illustrative but not limitative. In the examples all parts are by weight.

EXAMPLE I

Four parts of 1:2'-dianthrimide were dissolved in 40.0 parts of 98% sulfuric acid. When completely dissolved the mass was slowly run into 200 parts of boiling water, filtered and washed free from acid. The moist filter cake was held in this form for incorporation in the printing paste.

Ten parts of a water-insoluble urea-formaldehyde resin dissolved in a mixture of xylene and butanol, representing 5.0 parts of the resin in 2.0 parts of xylene and 3.0 parts of butanol were mixed with 7.5 parts of 37% castor oil modified alkyd resin dissolved in 7.5 parts of xylene. This mixture was in turn stirred into 37 parts of commercial aliphatic hydrocarbon solvent mixture with a boiling range of 145°–210° C.

Twenty parts of the 1:2'-dianthrimide, the preparation of which is described above (consisting of 4.0 parts of dry pigment and 16.0 parts of water), 40 parts of water and 1 part of bentonite clay were stirred together and added to the lacquer phase. The entire mixture was then passed repeatedly through a colloid mill until it was well homogenized, forming a stable water-in-oil emulsion.

The thick emulsion thus obtained was printed on cotton goods from an engraved roll in the usual manner. The printed goods were dried by passage over a heated cylinder. The printed portions of the goods were colored brown (red cast) of excellent properties to laundering, bleaching and to light.

EXAMPLE II

Four parts of 1:2'-5:2''-trianthrimide were dissolved in 40.0 parts of 98% sulfuric acid. When completely dissolved the mass was worked up with 400 parts of water, filtered and washed free from acid. The moist cake was added to a urea-formaldehyde-glyptal resin mixture prepared according to the method described in Example I. The entire mass was then passed through a colloid mill until it was homogenized forming a stable water-in-oil emulsion. This paste, printed on cotton goods from an engraved roll as described in Example I gave a sharply defined Bordeaux brown design of excellent properties to laundering, bleaching and to light.

EXAMPLE III

Four parts of mixed trianthrimide (1:1'-5:1'' and 1:1'-8:1'') obtained by condensing a mixture of 1:5-(1:8)-diamino-anthraquinone with two moles of 1-chloro-anthraquinone were dissolved in 40.0 parts of 98% sulfuric acid. When completely dissolved the mass was run into 400 parts of water, filtered and washed free from acid. The moist cake was added to a urea-formaldehyde glyptal resin mixture prepared according to the method described in Example I. The entire mass was then passed through a colloid mill until it was homogenized, forming a stable water-in-oil emulsion. This paste printed on cotton goods from an engraved roll, as in Example I, gave sharply defined red-brown design of excellent properties to laundering, bleaching, and to light.

EXAMPLE IV

Four parts of 1:1'-dianthrimide were dissolved in 40.0 parts of 98% sulfuric acid. When completely dissolved the mass was run into 400 parts of water, filtered and washed free from acid and was held as a moist paste until used.

Thirty-seven and one-half parts of a 40% solution (in xylene) of an interpolymer of ethyl-methacrylate and China-wood oil prepared as in Example IV of copending application, Serial No. 352,521 and consisting of 8.4 parts of ethyl methacrylate to 6.6 parts of China-wood oil, and 22.5 parts of xylene was mixed with 20 parts of an aqueous paste 1:1'-dianthrimide, the preparation of which is described above (consisting of 4.0 parts of dry pigment and 16.0 parts of water). The aqueous paste was dispersed in the lacquer by means of high speed agitation. Thirty-five parts of an aliphatic hydrocarbon solvent mixture with a boiling range of 145–216° C. and 57.5 parts of water were added and the mixture was emulsified using a high speed homogenizer.

Cotton goods printed with this paste on an engraved roll as in Example I were colored orange-brown of excellent fastness properties to laundering, bleaching and to light.

EXAMPLE V

Four parts of 4:4'-diamino-1:1'-dianthrimide were dissolved in 40.0 parts of 98% sulfuric acid. When completely dissolved the mass was run into 400 parts of water, filtered and washed free from acid and held as a moist paste until used.

Twenty parts of this paste containing 4 parts of dry pigment and 16 parts of water were incorporated with 37.5 parts of the 40% solution of the interpolymer described in Example IV and made up to a suitable printing emulsion as described in Example IV.

Cotton goods were printed with this emulsion from an engraved roll as in Example I. The printed portions of the goods were colored in black shades (blue cast) of good fastness properties.

EXAMPLE VI

Four parts of the halogenated condensation product (dibromo-naphthalene with 1-amino-anthraquinone) were dissolved in 40.0 parts of 95% sulfuric acid. When completely dissolved the mass was run into 400 parts of water, filtered and washed free from acid and held as a moist paste until used.

Twenty parts of this paste containing 4.0 parts of dry pigment and 16.0 parts of water were incorporated with 37.5 parts of the 40% solution of the interpolymer described in Example IV and made up to a suitable printing emulsion as described in Example IV.

Cotton goods were printed with this emulsion from an engraved roll as in Example I. The printed portions of the goods were colored in scarlet-red shades of excellent fastness properties.

The halogen compound used as a pigment in Example VI was made by the following method:

A. Bromo-naphthalene

Thirty parts of naphthalene was suspended in 90.0 parts of ortho-dichloro-benzene, 0.1 part of iodine was added, the mass cooled to 5–7° C. and slowly a mixture of 37.5 parts of bromine and 31.9 parts of sulfuryl chloride was added. Thereafter the mass was stirred for several hours, then heated to 50° C. and maintained for one hour. The mass was then steam distilled free from ortho-dichloro-benzene. After cooling the dibromo-naphthalene solidified. The crude dibromo-naphthalene obtained was recrystallized from 5.0 parts of alcohol.

B. Condensation of dibromo-naphthalene with 1-amino-anthraquinone 375 parts of naphthalene, 75 parts of 1-aminoanthraquinone, 53 parts of dibromo-naphthalene (as obtained under A), 40 parts of sodium carbonate (dry) and 1 part of copper powder were heated together to 215° C. and maintained for 5 hours, cooled to 130° C. and 700 parts of ortho-dichloro-benzene added. The slurry was filtered at 30° C., washed with ortho-dichloro-benzene, alcohol and hot water in turn and dried.

C. Halogenation of the condensation product B

Twenty-five parts of the condensation product B were suspended in 75 parts of nitrobenzene, 0.1 part of iodine was added. The charge was cooled to 5°–7° C. and a mixture of 15.5 parts of bromine and 11.5 parts of sulfuryl chloride was slowly added. Thereafter the mass was stirred for several hours at 25° C., then heated to 50° C. and maintained for one hour. Fifty parts of alcohol were added at 50° C., the solid filtered off, washed with alcohol and dried.

EXAMPLE VII

Four parts of Bz-1-benzanthronylamino-anthraquinone (obtained by condensing Bz-1-bromobenzanthrone with 1-amino-anthraquinone) were dissolved in 40.0 parts of 95% sulfuric acid. When completely dissolved 2.5 parts of water were added, the mass heated to 110° C. and maintained for one hour, cooled to 30° C. and poured into 400 parts of water, then filtered and washed free from acid. The cake was suspended in 750 parts of water, 12.5 parts of sodium hypochlorite were added. The suspension was heated to 50–55° C. and maintained for 2 hours, then filtered and washed free from alkali and held at a moist paste until used.

The moist cake was added to a urea-formaldehyde-glyptal resin mixture prepared according to the method described in Example I. The entire mass was then passed through a colloid mill until it was homogenized, forming a stable water-in-oil emulsion. This paste printed on cotton goods from an engraved roll and dried by passage over a heated roll gave a sharply defined orange shade (brown cast) of excellent fastness properties to laundering, bleaching and to light.

Among the advantages of this invention is that it puts to use a class of colors which were previously not useful as vat dyes because of poor tinctorial value and undesirable shades. Another advantage is that the emulsions require no reducing agent, are substantially neutral, and may be used on animal fibers.

As many apparently widely different embodiments of this invention may be made without departing from the spirit and scope thereof, it is to be understood that we do not limit ourselves to the specific embodiments thereof except as defined in the appended claims.

We claim:

1. An emulsion comprising a film-forming material, water, a water-insoluble solvent for the film-forming material and a poly-anthrimide pigment.

2. A lacquer emulsion comprising a film-forming material, water, a water-insoluble solvent for the film-forming material, and the pigment 1:2'-dianthrimide.

3. A lacquer emulsion comprising a film-forming material, water, a water-insoluble solvent for the film-forming material, and a pigment being the mixed trianthrimide obtained by condensing a mixture of 1:5-(1:8)-diamino-anthraquinone with 1-chloro-anthraquinone.

4. A lacquer emulsion comprising a film-forming material, water, a water-insoluble solvent for the film-forming material, and a pigment being a halogenated product of the condensation of dibromo-naphthalene with 1-amino-anthraquinone.

5. A lacquer emulsion comprising a film-forming material, a water-insoluble solvent for the film-forming material and a pigment represented by the formula Aq—NH—Aq, in which Aq is of the anthraquinone series.

6. A lacquer emulsion comprising a film-forming material, a water-insoluble solvent for the film-forming material and a pigment represented by the formula Aq—NH—(X)Aq, in which Aq is of the anthraquinone series and X is of the anthraquinone series.

7. A lacquer emulsion comprising a film-forming material, a water-insoluble solvent for the film-forming material and a pigment represented by the formula Aq—NH—(X)Aq, in which Aq is of the anthraquinone series and X is of the naphthalene series.

8. The process of coloring textiles which comprises applying thereto an aqueous organic emulsion containing a polyanthrimide pigment.

9. The improvement in the art of printing textiles which consists in filling the engraved lines of an intaglio plate with an emulsion comprising a film-forming material, water, a water insoluble solvent for the film-forming material, and a water insoluble polyanthrimide pigment, and printing the emulsion upon a textile.

10. The improvement in the art of textile printing which consists in filling the engraved lines of an intaglio plate with an emulsion comprising a film-forming material, a water insoluble solvent therefor, water, and an insoluble pigment of the type represented by the formula:

$$Aq—NH—(X)Aq$$

in which X is nothing or is one of a group consisting of Aq—NH— and Naph—NH—, and in which Aq is of the anthraquinone series.

ALEXANDER J. WUERTZ.
JOSEPH DEINET.